March 14, 1933.  W. D. ALLEN  1,901,793
ANGLE DETECTOR
Filed Aug. 3, 1931
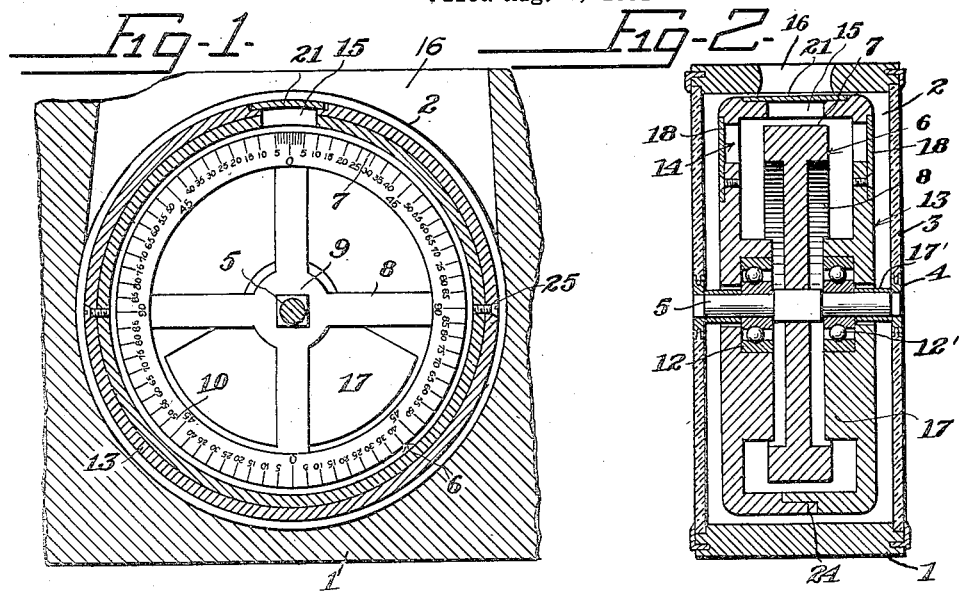
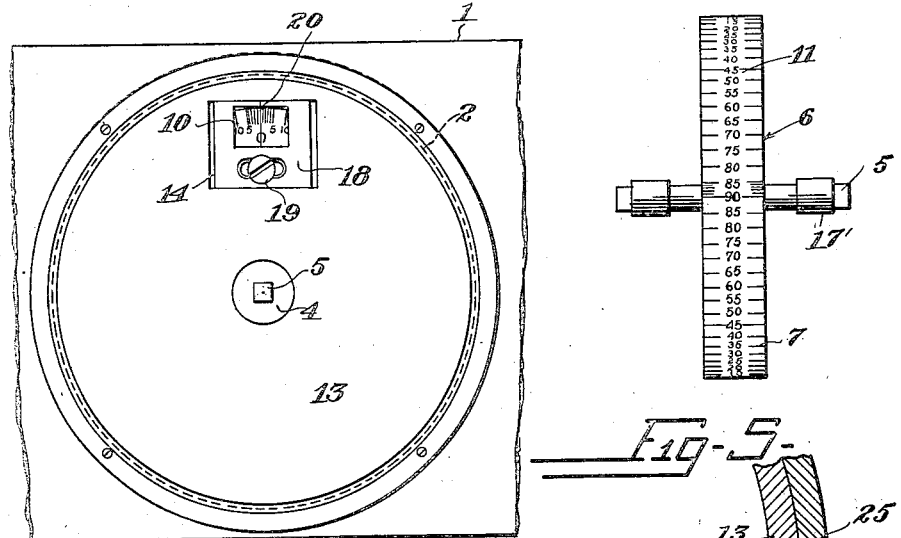
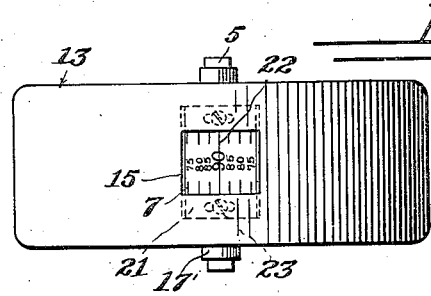
William D. Allen
INVENTOR
BY Victor J. Evans
and Co. ATTORNEY Patented Mar. 14, 1933

1,901,793

UNITED STATES PATENT OFFICE

WILLIAM D. ALLEN, OF EVANSVILLE, INDIANA

ANGLE DETECTOR

Application filed August 3, 1931. Serial No. 554,887.

This invention relates to new and useful improvements in angle detectors or levels and has for the primary object, the provision of a fixed scale and a movable hair line to automatically adjust itself relative to the scale according to the angle or degree in which the device is positioned thereby allowing a person to easily determine the degree of an angle by referring to the hair line and number on the scale in alignment therewith.

Another object of this invention is the provision of a weighted mounting for the hair line which will correctly position the hair line relative to the scale according to the angle in which the device is positioned and which provides a closure for the fixed scale.

A further object of this invention is the provision of means for adjustably securing the member bearing the hair line on the mounting therefor, subsequently providing means for adjusting the hair line relative to the scale which permits adjustment of the device to cure inaccuracies that may occur during the use of the device.

A still further object of this invention is the provision of an angle detector of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a vertical sectional view illustrating an angle detector constructed in accordance with my invention.

Figure 2 is a transverse sectional view illustrating the same.

Figure 3 is a front elevation illustrating the means of adjusting the hair line relative to the scale.

Figure 4 is an edge elevation illustrating the scale bearing member.

Figure 5 is a detail sectional view illustrating the means of securing the sections of the mounting together.

Figure 6 is a plan view illustrating the device removed from the body of the detector.

Referring in detail to the drawing, the numeral 1 indicates the body of an angle detector or level provided with an opening 2 closed by transparent panels 3 and which are centrally apertured to receive bearing members 4 having squared openings that receive correspondingly shaped ends of a shaft 5. The intermediate portion of the shaft 5 is squared and has fixed thereon a scale bearing member 6 in the form of a wheel including a rim portion 7, spokes 8 and a hub portion 9 fixed to the shaft 5. Scales 10 are formed on the side faces of the rim 7 as shown in Figure 1 while a scale 11 is formed on the periphery of the rim portion 7 of the scale member 6.

Bearings 12' are mounted on the shaft 5 and rotatably support between the panels 3 a hair line mounting 13 in the form of a sectional casing of circular formation which encloses the scale bearing member 6 and is provided with oppositely disposed sight openings 14 and a peripheral sight opening 15. The body 1 of the level in one face thereof is provided with a sight opening 16 to cooperate with the sight opening 15 in permitting a person to read the scale upon the scale bearing member 6. The side walls of the mounting 13 are provided with oppositely disposed enlarged portions 17 cooperating with each other in forming a counter-weight for the mounting 13 to maintain the mounting in a given position when the body 1 and scale bearing member 6 are varied or moved to obtain the degree of an angle.

Spacing sleeves 17' are located on the shaft 5 between the bearings 12' and the panels 3 to retain the various parts in proper relation and to prevent the detector from moving relative to the mounting therefor and aid in preventing dust or foreign matter from entering the device.

Panels 18 close the sight openings 14 and are adjustably secured to the mounting 13 by set screws 19 whereby they may be adjusted on the mounting 13 to vary the hair lines 20 carried thereby relative to the scale 10 of the member 7. The sight opening 15 is provided with an adjustable panel 21 and has a hair line 22 cooperating in conjunction with the scale 11 and the hair line 22 may be varied relative to the scale line by adjusting the panel 21 through the set screws 23.

By referring to Figure 2 it will be seen that the mounting 13 is constructed from companion sections having flanged or overlapped portions 24 which are secured together by set screws 25 counter-sunk as shown in Figure 5 and covered with a suitable material as at 26.

From the foregoing description taken in connection with the accompanying drawing, it will be noted that a device has been provided whereby the degree of an angle can be easily determined by properly positioning the body 1 and referring to the hair line in conjunction with the scale arranged on the scale bearing member 6 and further it will be noted that owing to the mounting of the casing or mounting 13 that the same will move freely relative to the body 1 when the position of the body 1 is varied so that the device will accurately give the degree of the angle in which the body 1 is positioned.

While I have shown and described the preferred embodiment of my invention, it will be understood that minor changes in construction, combination and arrangement of parts may be made without departing from the spirit and scope of the invention as claimed.

Having thus described my invention, what I claim is:

1. An angle detector comprising a body having an opening, a scale bearing member fixed to the body within the opening, a mounting having a hair line and movably secured in the opening of the body and forming a closure for the scale bearing member and having sight openings, and a weight for said mounting.

2. An angle detector comprising a body having an opening, a scale bearing member fixed within the opening of the body, a mounting having a hair line and movably secured in the opening of the body and enclosing the scale bearing member and having sight openings and including detachable sections, and a weight formed on said mounting.

3. An angle detector comprising a body having an opening, transparent panels closing said opening, a shaft carried by the panels, a fixed scale bearing member carried by the shaft and movable only with the body, a mounting journaled on the shaft and enclosing the scale bearing member and having sight openings, and plates closing the sight openings and having hair lines to cooperate with the scale in determining the degree of an angle.

4. An angle detector comprising a body having an opening, transparent panels closing said opening, a shaft fixed to said panels, a circular scale bearing member fixed to the shaft, a mounting journaled on said shaft and closing the scale bearing member and including detachable sections and having sight openings, and plates having hair lines adjustably mounted over the sight openings.

5. An angle detector comprising a body having an opening, transparent panels closing the openings, a shaft carried by said panels, a fixed scale bearing member carried by the shaft and movable only with the body, a sectional mounting journaled on the shaft and enclosing the scale bearing member and having sight openings, plates having hair lines overlying the sight openings, and means adjustably securing the plates to the mounting to permit the hair line to be varied relative to the scale on the scale bearing member.

In testimony whereof I affix my signature.

WILLIAM D. ALLEN.